United States Patent [19]

Garziera et al.

[11] 4,277,835

[45] Jul. 7, 1981

[54] APPARATUS FOR RECORDING AND DISPLAYING OR PLOTTING GRAPHS

[75] Inventors: Gastone Garziera, Ivrea; Federico Pisani, Scarmagno, both of Italy

[73] Assignee: Ing. C. Olivetti & C., S.p.A., Turin, Italy

[21] Appl. No.: 883,245

[22] Filed: Mar. 3, 1978

[30] Foreign Application Priority Data

Mar. 9, 1977 [IT] Italy ............................ 67509 A/77

[51] Int. Cl.³ ........................... G06F 3/12; G06F 3/13
[52] U.S. Cl. .................................................. 364/900
[58] Field of Search ... 364/200 MS File, 900 MS File; 179/15 AV; 340/324 AD, 747, 768, 800

[56] References Cited

U.S. PATENT DOCUMENTS

| | | | |
|---|---|---|---|
| 3,165,045 | 1/1965 | Troll | 340/324 AD |
| 3,471,848 | 10/1969 | Manber | 340/324 AD |
| 3,833,891 | 9/1974 | Howard et al. | 364/900 |
| 3,835,456 | 9/1974 | Angelle et al. | 364/900 |
| 3,973,245 | 8/1976 | Belser | 340/324 AD X |
| 4,074,254 | 2/1978 | Belser | 340/324 AD |
| 4,079,458 | 3/1978 | Rider et al. | 364/900 |

OTHER PUBLICATIONS

Ojalvo, M., "Data Compression Technique for the Elimination of Repeating Byte Strings", IBM TDB vol. 16, No. 8, Jan. 1974, pp. 2483-2486.

*Primary Examiner*—Gareth D. Shaw
*Assistant Examiner*—Thomas M. Heckler
*Attorney, Agent, or Firm*—Schuyler, Banner, Birch, McKie & Beckett

[57] ABSTRACT

The apparatus can deal with graphs obtained as a computer output and comprises recording means controlled by a computing unit in response to the generation of each point of the graphs for recording in a memory an indication of its location in the graphs, addressing means for addressing said recording means so as to record the subsequent location indications being recorded adjacent and in the same order of the representation of the points made by said displaying or plotting means, and shifting means conditioned by said addressing means when the recording of a point is addressed for causing the shifting in said memory of the indications of all points following said recorded point in said order. The graph so recorded is plotted under the control of means which reads said memory in sequence. The memory is organized in cells, each one adapted to receive at least one of a group of points of a predetermined subarea of the plot. Each cell, when recording no points, is adapted to record a number indicating a plurality of blank subareas comprised between two subareas having at least one point recorded in the memory, whereby the blank subareas are recorded in compressed forms.

Partial images are recorded with compacted record of blanks and are transferred to a disk memory. In order to be plotted all the partial images are extracted in parallel and, upon decompacting, the blacks are compounded in a printing buffer so as to enable a point printing head to plot the entire image in a single scanning of the paper.

18 Claims, 10 Drawing Figures

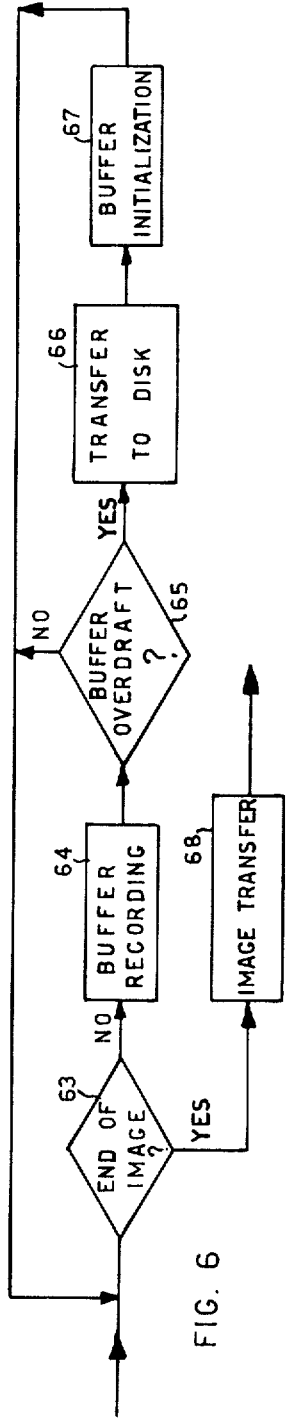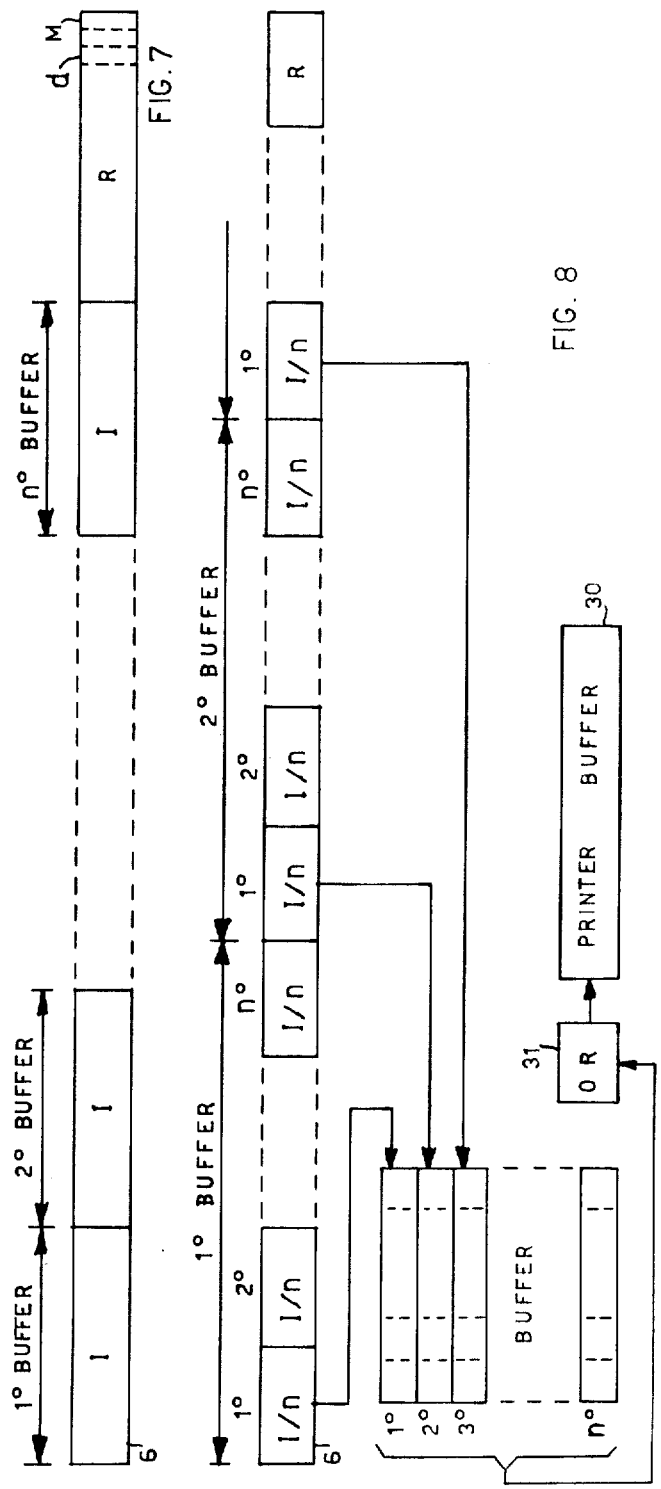

APPARATUS FOR RECORDING AND DISPLAYING OR PLOTTING GRAPHS

BACKGROUND OF THE INVENTION

This invention relates to an apparatus for recording and displaying or plotting graphs obtained as a computer output, comprising a computing unit for sequentially generating the points of the graphs, a read-write operating memory for storing said graphs and means for displaying or plotting a graph so stored.

There are known apparatus for recording graphs to be displayed, for instance on a CRT. In a known apparatus, a device for reading the graph on the memory line by line controls a graph tracer to display the entire graph in a single reading, thus preventing the tracer on the paper to be moved with frequent reciprocations.

Since the storing of a graph, in form of points of a matrix codified according to the binary system, requires a big capacity of the memory, an apparatus has been already proposed, wherein the data of the graph in the memory are compacted by recording the points or blanks with a code representing the number of adjacent similar points or blanks. However, this apparatus requires (for compacting the graph) a processing operation, in addition to the operation for generating the graph, which is very intricate and expensive.

SUMMARY OF THE INVENTION

This and other disadvantages are obviated by the apparatus for recording and displaying or plotting graphs according to the invention, which comprises recording means controlled by said computing unit in response to the generation of each point of the graph for recording in said memory an indication of its location in the graph, addressing means for addressing said recording means as to record the subsequent location indications adjacent and in the same order of the representation of the points made by said displaying or plotting means, and shifting means conditioned by said addressing means when the recording of a point is addressed for causing the shifting in said memory of the indications of all points following said recorded point in said order.

BRIEF DESCRIPTION OF THE DRAWINGS

A preferred embodiment of the invention is disclosed in the following description made, by way of example not in a limiting sense, in connection with the accompanying drawings, wherein:

FIG. 6 is a flow chart of the graph storing operations;

FIG. 7 is a diagram of an auxiliary memory storing a plurality of graphs;

FIG. 8 is a diagram showing the composition of the graphs to be plotted;

DESCRIPTION OF THE PREFERRED EMBODIMENT

Figure 1:
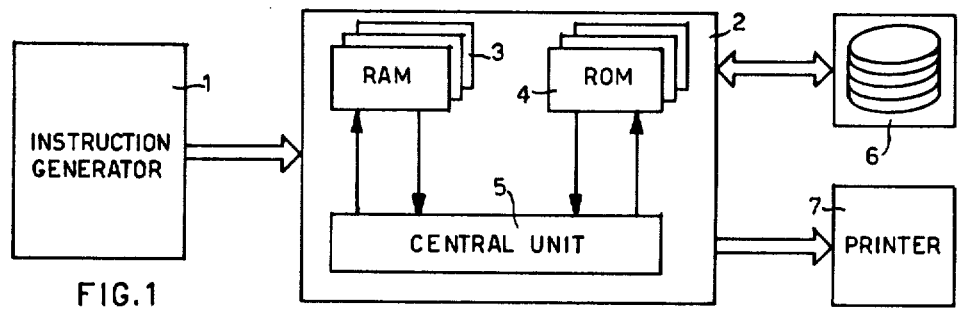
FIG. 1 is a block diagram of a recording and plotting apparatus according to the invention.

With reference to FIG. 1, the numeral 1 indicates an instruction generator, which may be formed by a keyboard or a user program unit, for example a perforated or magnetic tape reader, a magnetic disk unit etc. The generator 1 is adapted to generate a set of instructions for a mini or microcomputer 2, substantially of the type described in the U.S. Pat. No. 3,987,420. The computer unit is connected to a printer 7 and an external or auxiliary memory unit including a magnetic disk 6. The printer 7 includes a serial mosaic thermal printing head having a column of seven printing elements and adapted to be fed in parallel with a variable configuration of seven signals, each one associated to one of said printing elements. Therefore, according to the current configuration of signals, each time a corresponding configuration of printing elements is energized to print a corresponding group of points of the column.

The printer 7 is adapted to print lines of 80 characters on a printing area or page, the points of each column forming a printing subarea. To this end the printing head cooperates with moving means not shown, for moving the head along the printing line with respect to the paper, during the printing action. In the case the printing head is controlled for printing alphanumeric characters according to a conventional matrix of 5×7 points, the printing head is transversely moved through 5 columns or unit steps during the character printing, plus two columns for generating the space between two adjacent characters. Therefore, in correspondence with these two columns, the printing head is fed with two bytes having all bits at zero.

The computer 2 comprises a read-write memory RAM 3 for user programs and data, including data of positions relating to points to be printed or plotted. The computer 2 comprises also a ROM 4 for microprograms controlling the execution of all functions of the apparatus. Finally the computer 2 includes a central unit 5 for executing the microprograms.

Figure 2:
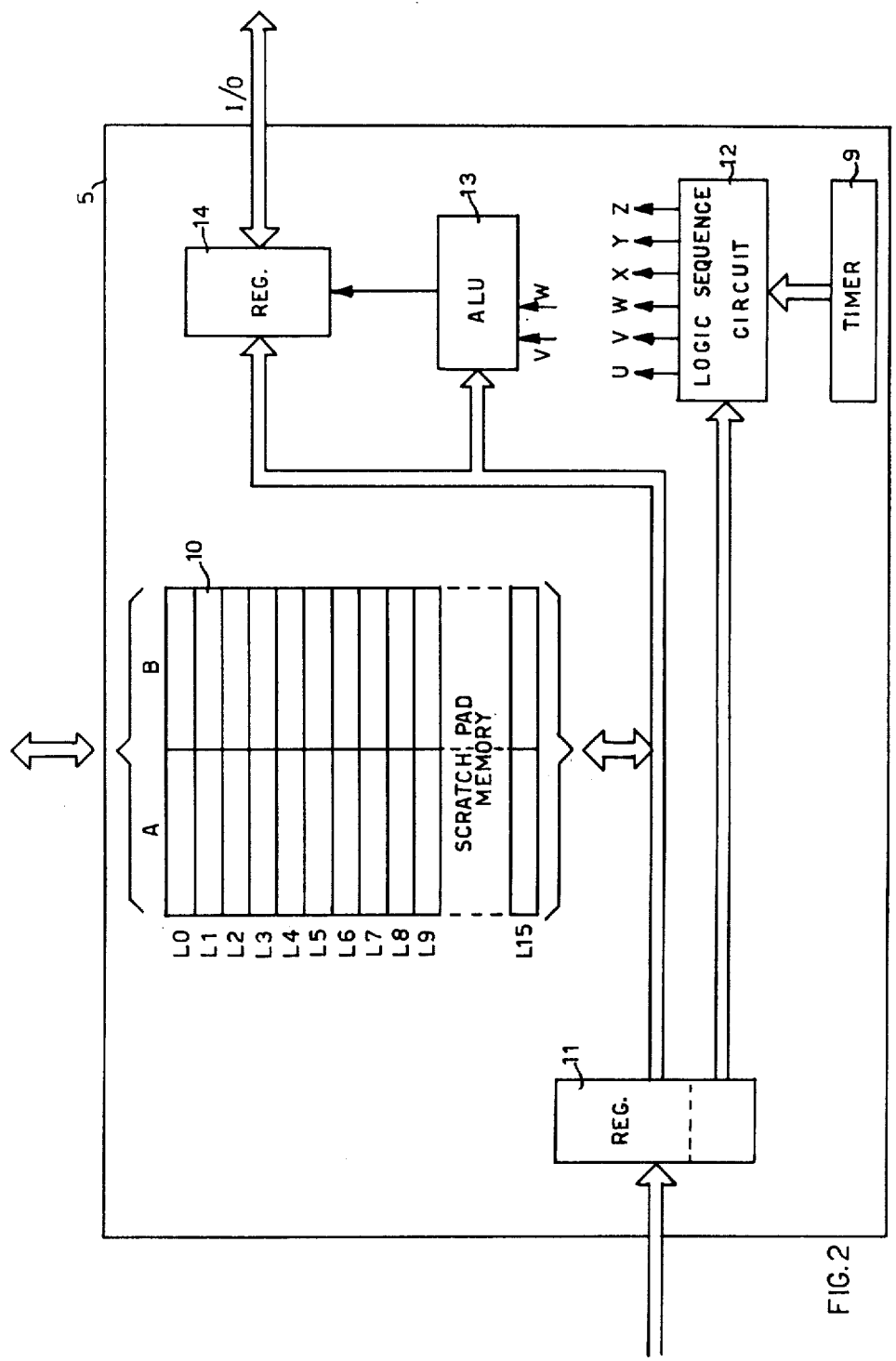
FIG. 2 is a block diagram of the central unit of the apparatus.

The central unit 5 (FIG. 2) comprises a timing circuit 9 and a scratch pad memory SP 10 having 256 bits organized either in 16 registers L0–L15 each one formed of two bytes, or in 16 pair of registers A0,-B0–A15,B15 each one formed of one byte. Some of these registers are used to contain addresses of the user program in RAM 3 or of the microprogram in ROM 4. Other registers are used to temporarily store data to be processed or intermediate results of the data processing.

Furthermore, the central unit 5 includes a microinstruction register 11 connected to the ROM 4, to store each time the individual microinstruction to be executed. The function code of each microinstruction is sent to a logic sequence circuit 12, which under the control of the timing circuit 9 is adapted to emit a set of enabling signals U–Z. Particularly, the signal U is adapted to enable the addressing of the memory 10, the signals V and W are adapted to control an arithmetic and logic unit ALU 13.

The ALU 13 may be connected to the SP 10 either for receiving the data to be processed or for storing therein the intermediate results. Both data and results may be also sent by the ALU 13 to a register 14 connected thereto. In addition said data and results may be sent to the printer 7 (FIG. 1) under the control of the signal X, to the disk unit under the control of the signal Y and to the RAM 3 under the control of the signal Z.

Figure 3:
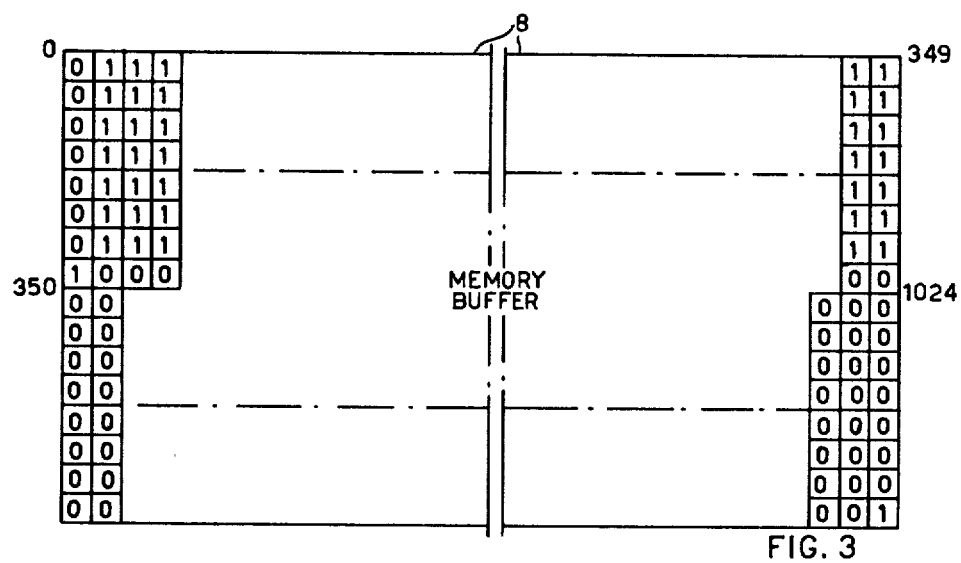
FIG. 3 is a diagram of the initialization of the memory of the apparatus.

According to the invention, some of the user instructions when executed are adapted to control the computer 2 to generate drawings or graphs formed according to a matrix of points, to record said drawings or graphs in RAM 3, and to plot them by means of the printer 7. To this end the RAM 3 is divided in a plurality of pages each one having the capacity of 1 K bytes. At least one of said pages, indicated by the numeral 8 in FIG. 3, is used as memory buffer for recording the graph, the buffer 8 is divided into cells each one adapted to store a byte of 8 bits. To this end the bytes of the buffer 8, indicating a point of the graph, have a "1" on the 8th bit and the bytes indicating the blanks have a "0" on the 8th bit. As it will be seen later, if the 8th bit is "1", the configuration of the other seven bits indicates the specific points to be printed on the column of seven points, if the 8th bit is "0", the configuration of the other seven bits indicates in binary code the number of blanks compacted in a single byte. It is thus evident that a single byte can represent up to 128 subsequent blanks, whereby a compact record of the blanks is obtained. It is also evident that the seven bits of each byte represent a group of indicia or indications associated with the seven points of a column, whereas the 8th bit represents an additional indication.

When a graph is to be stored, the instructions for recording the graph, and possibly the instructions for causing the computer to execute functions or algorithms to generate the graph, must be introduced through the generator 1 either by a keyboard or by a program unit. A program for generating and recording a graph starts always with an instruction INIMAGE.

Figure 4:
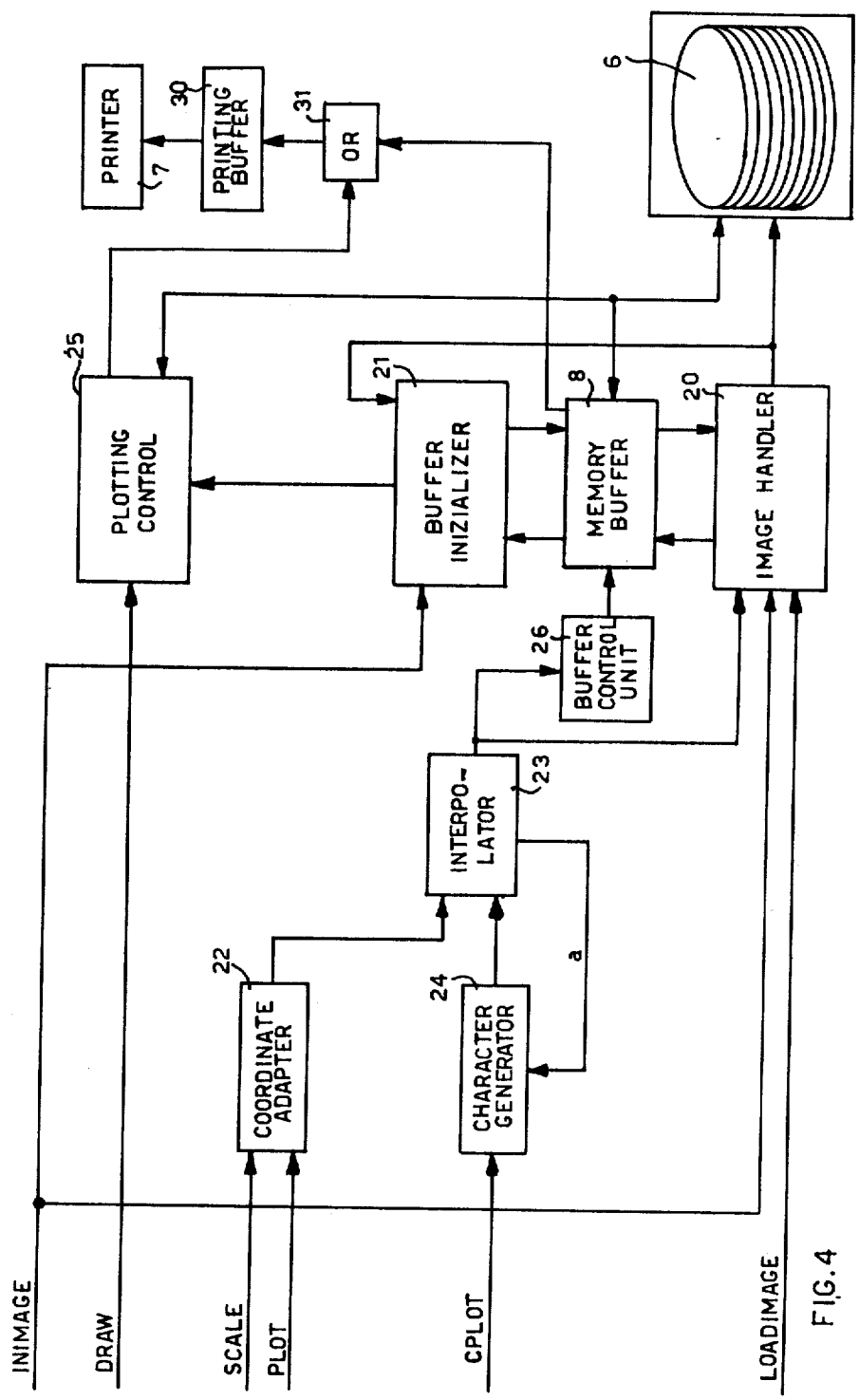
FIG. 4 is a diagram of the units carrying out the graph generating functions of the apparatus.

An image handling device 20 (FIG. 4) included in the computer 2 comprises a portion of the ROM 3, the logic sequence 12, the memory 10 and the ALU 13 and is capable of handling the storage of an image on the magnetic disk 6 in the manner hereinafter described. In response to the instruction INIMAGE introduced by the generator 1 (FIG. 1), the handling device 20 is controlled as to reserve a predetermined section of the disk 6 represented in FIG. 7, to the image to be recorded and to set and store a corresponding label or address of the section. Furthermore, the handling device 20 causes the section to be divided in a plurality of n subsections I, each one having the same capacity as the buffer 8. A further subsection R of the disk 6 is reserved for storing supplementary data relating to the image, including the name of the image, the scale, the field of coordinates etc. A system for dividing a memory into subsections with an index is disclosed in the U.S. Pat. No. 4,028,680 with reference to FIG. 15 thereof.

Simultaneously, an initialization circuit 21, also included in the computer 2, is controlled by the instruction INIMAGE and by the handling device 20 to initialize the buffer 8 (FIG. 3) for generating the image. To this end the first byte and the last byte of the buffer 8 are recorded with a "0" in the first seven bits and a "1" in the 8th bit, thus defining the beginning and the end of the memory portion to be used for storing the image. The 349 bytes following the first byte are recorded with a "0" in the 8th bit, whereby the bytes indicate blanks, and with a "1" in all the other seven bits, representing the binary number 127, to indicate that each byte stores 128 columns of blanks.

Since one line of 80 characters corresponds to 560 columns of point printing positions, a text of 80 lines each one of 80 characters corresponds to 44,800 columns of positions. If the entire field of image is blank, it can be represented by 44,800:128 = 350 bytes, whereby it is thus clear that the first 350 bytes of the buffer 8 are initialized to represent one page of 80 lines of 80 characters. In addition, the initialization circuit 21 (FIG. 4) is adapted to initialize the buffer 8 according to the size indicated by the argument of the instruction INIMAGE. Such size may include a variable number of K bytes from 1 K to 20 K.

The bytes of the buffer 8 from 350 to penultimate byte, which is 1023th in the case the buffer 8 has a capacity of 1 K, are initialized by being recorded with all bits to zero. This portion of the buffer 8 initially does not record any part of the image but, as it will be seen later, as soon as the recording of image is started, this portion of the buffer 8 will receive the shifting of the initialized portion and finally all bytes thereof will store corresponding records of the image.

The next following instruction introduced through the generator 1 (FIG. 1) into the computer 2, is the instruction SCALE, which when executed conditions a coordinate adapter 22, included in the central unit 5, to calculate the measurement units for the two coordinate axes and the origin or zero points of the plotting system. The adapter 22 includes part of the ALU 13, the memory 10 and the circuit 12. This instruction has the format SCALE $x_1$, $x_2$, $y_1$, $y_2$, wherein $x_1$, $x_2$, $y_1$, $y_2$ represent the ends of the two coordinate axis of the image to be plotted and can be obtained by executing on the central unit 5 specific algorithms or algebraic functions. The measurement units on the axis, that is the minimum size which can be registered on each axis, is obtained by dividing the segments of the axes $x_2-x_1$ and $y_2-y_1$ by the number of points which can be plotted in each segment, that is 560. If $x_2$ and $x_1$, and/or $y_2$ and $y_1$ have all the same sign, the origin of the coordinate axes is external to the plotting field. On the contrary, if $x_2$ and $x_1$, and $y_2$ and $y_1$ have different sign, said origin is internal to the plotting field. A similar technique for adapting the coordinates to the desired scale and for defining the plotting field is disclosed in the U.S. Pat. No. 3,839,630 (cols. 62, 63, 262) to E. E. Olander et al.

The data processed by the coordinate adapter 22 are transferred to an interpolating device 23, included in the central unit 5. Particularly, the interpolating device 23 comprises the ALU 13 (FIG. 3) and the memory SP 10 and is used for generating data for integrating the image generation process. To this end a set of instructions PLOT are supplied to the apparatus. Each one of these instructions presents the format PLOT x, y, where x and y represent coordinates of the end point of a segment to be plotted departing from the initial point previously recorded. Of course the departing point of the first segment is always the origin of the coordinates. The coordinates x, y can be defined directly by the operator through the generator 1 (FIG. 1), or by means of algebraic expressions to be processed by the coordinate adapter 22.

Each instruction PLOT x, y when executed controls the interpolating device 23, which generates in a known manner, in correspondence with the coordinates x, y of the end point of the segment to be plotted, a series of coordinates of intermediate points of the segment. These point coordinates are individually recorded on the buffer 8 by means of a buffer control unit 26, which will be better described later.

In alternative to PLOT instructions for recording graphs, CPLOT instructions can be introduced through the generator 1 to generate and record alphanumeric characters, for instance to insert dimentions or labels in a graph or drawing. To this end, each CPLOT instruction when executed conditions a character generating unit 24 to supply, for each character to be recorded, the coordinates of the points of discontinuity of the broken line describing the character, to the interpolating unit 23. This latter generates the coordinates of the points intermediate to those received from the generating unit 24 and causes the control unit 26 to record them on the buffer 8. The interpolating unit 23, upon having generated the coordinates of all the points of a given segment, by means of a signal a requires to the character generating unit 24 the coordinates of the end point of the next following segment, till the recording procedure of the character indicated by the CPLOT instruction is completed.

More particularly, the buffer control unit 26 includes a register g of the RAM 3 (FIG. 5), which is settable with a number (from 0 to 1024 in the case the buffer 8 has a capacity of 1 K) to indicate an integer number F of bytes to be recorded during each interpolating operation. The control unit 26 also comprises another register h of the RAM 3 adapted to be set with a number from 0 to 7 to indicate the slope of the segment to be interpolated as a number of vertical unit distances between two points of the graph in two adjacent columns. Furthermore the control unit 26 includes a register b of the RAM 3 adapted to indicate the current position to be recorded on the buffer 8 and a register c adapted to accumulate for each transverse step of the printing head the units represented by the register h.

Both in the case of segments of a graph and in the case of segments of a character, the coordinates of the points generated by the interpolating unit 23 (FIG. 4) is effected as follows. The interpolating unit 23 sets on the register g (FIG. 5) of the control unit 26, for each segment to be interpolated, a number F equal to the interpolated points to be generated, in order to reserve a corresponding number of bytes on the buffer 8, the starting point of the segment being indicated by the register b. Then the control unit 26 causes, for each point to be recorded, a shifting of the contents of all the bytes of the buffer 8 following the one to be recorded. These bytes were recorded with one or more blanks, thus the byte to be recorded is cleared. Such a shifting causes the contents of the bytes indicating blanks to be transferred in the zone of the buffer 8 having bytes recorded with all zeros. Now the control unit 26 causes the register g to be decremented and the register b to be incremented. Then the control unit 26 records on the cleared byte the bit indicated by the register c, which is then incremented according to the contents of the register h. Finally, the control unit 26 is conditioned to record a "1" in the 8th bit to indicate that now the byte no more records a blank, but a point of the graph, while the next following byte, which previous represented 128 blanks, is updated.

Figure 5:
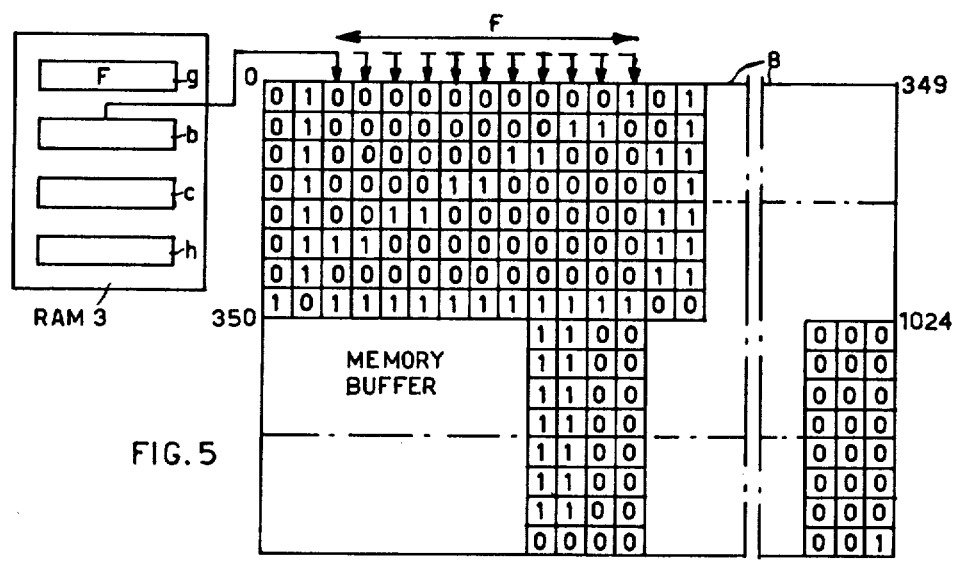
FIG. 5 is a partial diagram showing a memory recording a graph.

For example, with reference to FIG. 5 the register g stores a number F=11, while the register b is supposed to store the address of the third byte, the register c to store the number 6. To take into account that the plotting dots can be printed only in the discrete positions provided by the matrix, the absolute value of the slope calculated by the interpolator 23 is stored in a register h' (not shown). This value is rounded off each time by sensing whether its difference with one of the integers 0-7 is $\leq 0.5$. If the result of the sensing is negative, the register h is conditioned to store the integer incremented or decremented by 1 according to the sign of the slope. If the result of the sensing is positive, the integer number of the register h' is transferred to the register h without alteration. Of course, in the next interpolating cycle the register h' will record the slope plus or minus the portion of the slope subtracted or summed up during the previous rounding off. Of course, if the slope is too big, it could require more than one dot in a single column. This technique is well known in the art and is described in the article "An Algorithm for Computer Control of a Digital Plotter" by J. F. Bresenham, IBM System Journal, Vol. 4 No. 1, 1965, pp. 25-30. Continuing with the above example, it is assumed that the theoretical slope in the register h' is $-0.5$. The first bit to be recorded is the sixth from the top of the third byte. In the forth byte again a sixth bit will be recorded, since the register c should be decremented to 5.5 it remains at 6, whereby it should be clear that for each point the coordinates closest to the matrix of printable points are recorded.

Upon having recorded 11 points the register g is zeroized and the register c should store 0.5, but according to the above technique it will store 1, while the entire buffer 8 originally following the 3rd byte is shifted 11 bytes. The third byte, which thus becomes the 14th is now recorded to represent $128-11=117$ blanks (1110100). The 11 recorded bytes present all a "1" in the 8th bit. They store also in pairs a "1" in the 6th, 5th . . . , 1st bit, which indicate the printing elements of the printing head to be energized for plotting this portion of the graph.

If the register c should store a number greater than 7 or less than 0 it causes an overflow and is incremented, respectively decremented, as departing from 0, respectively from 7. In both cases the control unit 26 temporarily stops the recording for defining the byte corresponding to the next preceding or following strip of 560 bytes. This strip corresponds to the length of one line of the printing head. In fact the next point to be recorded is located in the same trasverse position but in the next preceding, respectively in the next following printing line.

To this end the control unit 26 merely substracts, respectively adds the value 560 to the contents of the register b, thus indicating in the buffer 8 the next byte to be recorded. Now the recording process is resumed departing from the byte indicated by this contents of the register b.

The procedure for recording intermediate points between other recorded points is similar to the one described above, wherein points are recorded departing from an initial situation where the buffer 8 records blanks. The intermediate points are therefore recorded upon shifting the contents of all the bytes following the one where the point must be recorded.

It is thus clear that the control unit 26, in response to the generation of each point of the graph, causes an indication of the location of the point to be recorded in the memory buffer 8 and that the addressing register b of RAM 3 (FIG. 5) is provided for addressing the control unit 26 as to record the subsequent location indications adjacent and in the same order of the representation of the points made by the printing head 7, irrespectively from their generation.

The recording program causes thus the graph to be generated segment by segment. The black points of the graph are recorded in the bytes recording blanks in compressed form, which present the 8th bit at zero. In this way the portion of the buffer 8 from the 350th byte is progressively occupied, since the bytes of this portion are progressively occupied by bytes recording blanks and bytes recording point, that is by the graph. The buffer 8 is full when, due to a shifting operation, the buffer 8 could have an overflow. This condition is defined by adding the contents of register b and register g and sensing the result under the control of the central unit 5, to state whether this is higher than the capacity of the buffer 8 to cause the control unit 26 to be disabled and the handling device 20 to be enabled. The device 20 causes now the contents of the buffer 8 to be transferred in one of the subsections I of the section of the disk 6 (FIG. 7), which was previously predisposed by the device 20. This latter also causes the subsection R to store data relating to the various records of parts of image on the disk 6. Particularly, a byte d of subsection R is used as index register for indirect addressing the disk subsection I to be loaded. This byte d is incremented upon each transfer operation from the buffer 8 and is read each time before said transfer operation for addressing the disk 6.

Particularly, for each operation of the interpolating unit 23, the central unit 5 controls a sensing operation of the program, indicated by 63 in FIG. 6, to define whether an end of image information is supplied by the generator 1. If the result of this sensing is negative the above described recording operation on the buffer 8, indicated by 64, is effected. The operation 64 is followed by the described overdraft sensing operation, on the buffer 8, indicated by 65. As long as the result of this sensing is negative, the sensing 63 and the operation 64 are repeatedly effected. When the result of the sensing 65 becomes positive, the above described image transfer operation, indicated by 66, is effected for transferring the image from the buffer 8 to the disk 6. Thereafter, the handling device 20 causes the initialization circuit 21 to initialize again the buffer 8 for the following image generating and recording operation 67 (FIG. 6).

On the contrary, if the result of the end of image operation 63 is positive, the image generating program causes the control unit 26 (FIG. 4) to stop the image generating and recording operation and the handling device 20 to effect a final transfer operation 68 (FIG. 6) of the last portion of the image from the buffer 8 (FIG. 4) to the disk 6.

What has been described for recording the image does not involve the printer 7. When an image stored on the disk 6 is to be plotted, an instruction DRAW is sent by the generator 1 (FIG. 1) to the central unit 5, to enable a plotting control unit 25 (FIG. 4) to control the composition of all partial images recorded on the disk 6.

To this end, the control unit 25 firstly causes the buffer 8 to be cleared. Then, the control unit 25 reads the contents n of the byte d of the subsection R (FIG. 7) of the disk 6, which indicates the number of recorded subsections. Correspondently, the control unit 25 causes each subsection I of the disk 6 to be divided in n portions having a capacity m=I/n, as indicated in FIG. 8. Simultaneously, the control unit 25 (FIG. 4) causes the buffer 8 to be divided in n equal portions (FIG. 8), each one having a capacity of m.

Figure 9:
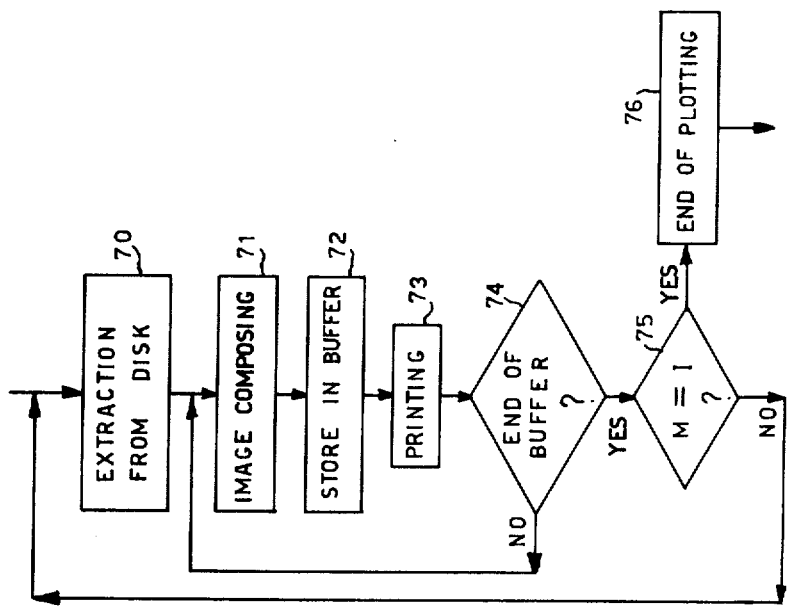
FIG. 9 is a flow chart of the graph composing operations for the plotting.

Then the control unit 25 causes the first m bytes of each portion of buffer 8 (vertically aligned in FIG. 8) to be recorded with the first m bytes of the individual images recorded in the portions I/n corresponding to on the various subsections I of the disk 6. These m bytes are indirectly addressed by means of a counter M formed of 12 bits, which is also included in the subsection R of the disk 6. In this way the control unit 25 causes in sequence the extraction from the disk 6 and transfer to the buffer 8 of the first n bytes, the second n bytes, the mth n bytes of the n portions of subsections I (operation indicated by 70 in the flowchart of FIG. 9). In this operation the records of the disk 6 are decompacted, since the individual bytes storing blanks are recognized and for each of said bytes in the buffer 8, a printing buffer 30 having the capacity of 560 bytes will record a number of empty bytes equal to the binary number represented by the first seven bits of the byte of the buffer 8.

Subsequently, the control unit 25 (FIG. 4) causes an OR logic circuit 31 to effect byte by byte the OR of the vertical sections of the buffer 8 in FIG. 8, that is of the first n bytes, second n bytes, ... The mth n bytes of the n portions of the buffer 8 (operation 71 in FIG. 9). In this way the various partial images stored in the disk 6 are composed, since bits can be stored both in a byte having a bit storing at least one point or in a byte representing a blank. The m bytes so composed are stored in the printing buffer 30 (FIGS. 4 and 8) to control the printer 7. The operation of storing in the buffer 30 is indicated by 72 in FIG. 9, while the control of the printer 7 is indicated by 73. Of course, only seven bits of each byte of the buffer 30 are used by the printing head, since the 8th bit does not represent any printing point.

Following each operation 73, the control unit 25 effects a sensing operation 74 to state whether the transfer from the buffer 8 to the buffer 30 has been completed. If not, the operations 71, 72 and 73 are repeated. When the result of the sensing 74 is positive, a further sensing operation 75 is effected to state whether the content of the register M is equal to the capacity of the individual subsection I. If the result of this sensing 75 is negative, that is M<I a block of m bytes is extracted from each subsection I of the disk 6 and transferred in the n portions of the buffer 8 (operation 70). When the result of the sensing operation 75 is positive (M=I=1024), the records from the disk 6 have been all extracted, whereby the control unit 25 (FIG. 4) causes an end of print operation 76 (FIG. 9) and restores the buffer 8 (FIG. 4) to the condition it had before the execution of the instruction DRAW.

From the above description, it results evident that the described apparatus is adapted to generate, on a memory having a predetermined capacity, a complex image, the record of which should require a memory having a much greater capacity. This is due to the fact that a plurality of partial images are generated, wherein the blanks are compacted from the beginning of the image generation and the black points are inserted among the blanks by shifting the records following the point to be recorded, till an overflow occurs in the memory. It is also clear that the partial images stored in the magnetic disk 6 form a complex image, which can be printed in response to the instruction DRAW in a single scanning operation of the printing head on the paper.

Figure 10:
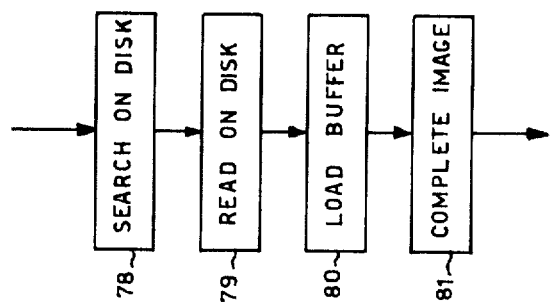
FIG. 10 is a flow chart of the operations effected to reinstate the graph generation.

An image previously stored in the disk 6 can be subsequently completed or updated. To this end an instruction LOADIMAGE, followed by the name of the image, is introduced through the generator 1 (FIG. 1). This instruction causes the handling device 20 to operate according to the flowchart of FIG. 10. At the beginning a search 78 is effected for finding the section of the disk 6 (FIG. 7) having the subsection R recorded with the name of the image. The contents of this subsection are then transferred to the RAM 3 to set up the various units of the apparatus with the same parameters and conditions used when the original image was recorded (operation 79, FIG. 10). Then the last recorded subsection I of the disk 6 (FIG. 7) is transferred to the memory buffer 8 (operation 80 in FIG. 10). Finally, the apparatus is enabled to store other records on the buffer 8 with additional records (operation 81), thus updating or completing the image.

It is intended that, improvements, modifications and additions of parts may be made to the described apparatus, without departing from the scope of the invention. For instance, the black points may be inserted in the buffer 8 upon preliminary shifting the records of the number F of bytes indicated by the register g. In addition, the plotting means may be replaced either by a CRT display or by a parallel printing head having a plurality of columns of printing elements controlled in parallel by the buffer 30. Finally, other instructions can be provided for defining or modifying the size and location of image, or for automatically generating specific geometric figures.

What we claim is:

1. In a graphic recording and plotting system for recording and plotting graphs obtained as a computer output, wherein said plotted graph consists of a plotted area which is divided in subareas arranged in sequence, each subarea including a group of locations of points of said graph, and having a computer unit for sequentially generating the points of the graph, and a read-write operating memory for storing said graph, the improvement comprising a data compaction system comprising:

said memory being divided in cells, each one adapted to store a group of indications associated with the points of the graph included in a corresponding subarea, said computing unit including an initialization means for recording in each cell a number indicating a corresponding plurality of adjacent blank subareas, whereby said cells store a compact record of said blank subareas, means for plotting a graph stored by said memory, addressable recording means controlled by said computing unit in response to the generation of each point of the graph for recording in an addressable cell of said memory an indication corresponding to the location of said generated point of the graph and an additional indication indicating that the selected cell records at least the indication of one of the associated point locations, addressing means included in said computing unit responsive to said numbers recorded in said cells for addressing said recording means as to record, in the next memory cell following a series of cells indicating points of the graph, a number indicating the total number of blank subareas separating the location of the next point to be recorded from the previous recorded locations, whereby the locations of the various generated points are recorded in the same order as the representation of the points to be made by said plotting means, shifting means included in said computing unit and conditioned by said addressing means when addressing said recording means at a cell recording at least one blank subarea for causing the shifting in said memory of the records of all cells following the addressed cell, and reading means for sequentially reading the cells of said memory for controlling said plotting means.

2. A compaction system according to claim 1, further comprising an auxiliary memory having a capacity which is a multiple of said operating memory, a transfer unit conditionable for transferring the content of said operating memory to said auxiliary memory, whereby a plurality of different graphs are individually recorded in said auxiliary memory, and control means included in said computing unit for causing said transfer unit to simultaneously transfer back in parallel the indications of a corresponding location of said plurality of graphs to said operating memory, whereby said reading means controls said plotting means to simultaneously plot said graphs.

3. A compaction system according to claim 1, comprising an auxiliary memory having a capacity multiple of said operating memory, a transfer unit conditionable for transferring the content of said operating memory to said auxiliary memory, means responsive to an overflow signal of said operating memory for so conditioning said transfer unit, and auxiliary addressing means for addressing the subsequent contents of said operating memory sequentially to corresponding portions of said auxiliary memory.

4. In a graphic recording and plotting system for recording and plotting graphs obtained as a computer output, and having a computer unit for sequentially generating the points of the graph, and a read-write operating memory for storing said graph, a printing head for plotting said graph and including a column of printing elements adapted to print at least one point on each printing position of said head, and means for relatively displacing said head with respect to a printing support in a direction substantially perpendicular to said column, the improvement comprising a data compaction system comprising:

said memory being formed of cells each one adapted to store a byte having a number of bits equal to the number of elements of said column and an additional bit indicating the recorded status of the cell, an initialization means operable to record in each one of said cells a binary number having a predetermined relationship with the number of elements of the printing head and indicating a corresponding plurality of adjacent blank columns requiring no printed points, and additional unrecorded bit indicating that one cell stores a compact record of said blank columns, addressable recording means controlled by said computing unit in response to the generation of each point of the graph for recording in an addressable cell of said memory a bit corresponding to the location of the generated point of the graph in the corresponding column and said additional bit indicating that the cell so recorded stores at least one point of the column, addressing means included in said computing unit responsive to the numbers recorded in said cells for addressing said recording means as to record, in the next memory cell following a series of cells indicating points of the graph, a number indicating the total number of blank columns separating the next point to be recorded from the previously recorded point, whereby the columns of the various generated points are recorded in the same order of the plot of the points to be made by said printing head, shifting means included in said computing unit and conditioned by said addressing means when addressing said recording means to a cell recording at least one blank column for causing the shifting in said memory of the records of all cells following the addressed cell, and, plot control means responsive to the so recorded cells of said memory for controlling the printing operation of said elements.

5. A compaction system according to claim 4, wherein said plot control means includes a printing control buffer for controlling said printing head as to print in each column a point corresponding to the recorded bit of a corresponding byte, reading means for sequentially reading the bytes of said memory, and decompacting means conditionable by said reading means for temporarily storing in said buffer, in response to a memory byte storing a number of blanks, a number of bytes corresponding to said number of blanks, each byte so recorded indicating one relative step of said printing head, whereby said compact record is decompacted.

6. A compaction system according to claim 5, comprising control means for controlling said reading means to sequentially read each time the bytes storing the portion of graph comprised in a printing line of said printing head.

7. A compaction system according to claim 6, comprising an auxiliary memory having a capacity multiple of said operating memory, a transfer unit conditionable for transferring the content of said operating memory to said auxiliary memory, means responsive to an overflow signal of said operating memory for so conditioning said transfer unit, auxiliary addressing means for addressing the subsequent contents of said operating memory sequentially to corresponding portions of said auxiliary memory, means for conditioning said control means to cause said reading means to simultaneously read in all portions of said auxiliary memory the section corresponding to the same printing line, and OR means for controlling said decompacting means as to store in each byte of said buffer all the points contained in the individual graphs.

8. A compaction system according to claim 7, comprising a character generating unit adapted to control said recording means for storing in said memory alphanumeric characters represented by locations of points, said transfer means being conditioned to transfer said alphanumeric characters to a predetermined portion of said memory.

9. A compaction system according to claim 8, wherein said control means include means for conditioning said reading means, as to read the record of each printing line of said predetermined portion simultaneously with the corresponding sections of all other portions of said auxiliary memory.

10. A compaction system according to claim 4, wherein said computing unit includes an interpolator for computing the locations of all points of a graph printable by said printing head and intermediate the locations of two predetermined points, said interpolator controlling said recording means.

11. A compaction system according to claim 10, including a coordinate and scale adapter settable for defining the field and the scale of a graph to be plotted, said adapter conditioning said interpolator as to calculate said locations according to said scale.

12. A compaction system according to claim 11, comprising an inclination setting register controlled by said interpolator for storing the inclination of a segment to be interpolated in term of points of said matrix with respect to the relative movement of the printing head, a second register being conditioned by said recording means to accumulate the inclination stored by said first register upon recording each one of said cells.

13. A compaction system according to claim 12, including sensing means for sensing an overflow of said second register, and means controlled by said sensing means for causing said recording means to skip to the corresponding cell of the next adjacent printing line.

14. An apparatus according to claim 11, comprising a character generating unit adapted to control said recording means to store in said memory alphanumeric characters represented by locations of points, said interpolator being adapted to interpolate the locations of points intermediate a pair of points defined by said character generating unit under the control of said coordinate and scale adapter.

15. In a graphic recording and plotting system for recording a graph to be plotted in form of individual points, wherein the area of plot is divided in subareas arranged in sequence, each subarea including a group of locations for said points, and having a memory divided in cells, each one adapted to record the points of one of said subareas, and generating means for generating the points of a graph, the improvement comprising a data compaction system comprising:

addressable recording means conditioned by said generating means for recording in a selected one of said cells at least one point of a corresponding subarea and an additional indication indicating that said selected cell records at least one point, and control means for causing each cell of said memory where said additional indication is not recorded to record a number indicating a pluraliy of blank subareas of said sequence.

16. A compaction system according to claim 15, wherein said control means includes an addressing means controlled by said generating means for addressing said recording means to a memory cell next following a series of cells indicating the total number of blank subareas separating the point to be registered from the previous registered point.

17. A compaction system according to claim 16, wherein said control means further includes shifting means conditionable by said addressing means when addressing a cell recording at least one blank subarea for causing the shifting in said memory of the records of all cells following the selected cell.

18. A compaction system according to claim 17, wherein said control means further includes updating means responsive to the operation of said shifting means for updating the record of the cells adjacent the one addressed by said addressing means according to the number of blank subareas separating the subarea including the recorded point from the subareas of the two closest previous recorded points.

* * * * *